(12) United States Patent
Fischer et al.

(10) Patent No.: US 12,536,494 B2
(45) Date of Patent: Jan. 27, 2026

(54) ACTIVITY BASED CHEMICAL SUBSTANCE INVENTORY MANAGEMENT

(71) Applicant: BASF SE, Ludwigshafen (DE)

(72) Inventors: Stefan Fischer, Lampertheim (DE); Jesper Nielsen, San Diego, CA (US); Simeon Sauer, Heidelberg (DE); Grit Baier, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 147 days.

(21) Appl. No.: 17/768,095

(22) PCT Filed: Sep. 10, 2020

(86) PCT No.: PCT/EP2020/075323
§ 371 (c)(1),
(2) Date: Apr. 11, 2022

(87) PCT Pub. No.: WO2021/083575
PCT Pub. Date: May 6, 2021

(65) Prior Publication Data
US 2023/0252406 A1 Aug. 10, 2023

(30) Foreign Application Priority Data

Oct. 30, 2019 (EP) .................................. 19206287

(51) Int. Cl.
*G06Q 10/087* (2023.01)
*G06Q 10/0832* (2023.01)

(52) U.S. Cl.
CPC ........ *G06Q 10/087* (2013.01); *G06Q 10/0832* (2013.01)

(58) Field of Classification Search
CPC ............. G06Q 10/087; G06Q 10/0832; G06Q 10/06395; G06Q 50/00
See application file for complete search history.

(56) References Cited

U.S. PATENT DOCUMENTS

| 6,969,763 B1 * | 11/2005 | Ecker | ..................... G16B 15/30 |
| | | | 536/24.31 |
| 7,392,150 B2 * | 6/2008 | Kuepper | ................ G01D 9/007 |
| | | | 236/1 C |

(Continued)

FOREIGN PATENT DOCUMENTS

| CN | 109685412 A | 4/2019 |
| JP | 4805768 B2 | 11/2011 |

(Continued)

OTHER PUBLICATIONS

Aung, Myo Min, and Yoon Seok Chang. "Temperature management for the quality assurance of a perishable food supply chain." Food Control 40 (2014): 198-207. (Year: 2014).*

(Continued)

*Primary Examiner* — Nathan A Mitchell
(74) *Attorney, Agent, or Firm* — ArentFox Schiff LLP (57) ABSTRACT

The present invention relates to a computer-implemented method for activity based chemical substance formulation management of a chemical substance formulation comprising (i) receiving input data, preferably via an input unit (10), of at least one storage segment data defined by at least temperature and storage duration and an initial chemical substance activity value of said chemical substance formulation; (ii) determining, specifically calculating, a remaining activity value of the chemical substance formulation based on the storage segment data and the initial chemical substance activity value via a processing unit (20); (iii) providing a remaining activity value for the chemical substance formulation, preferably via an output unit (30), and (iv) managing said chemical substance formulation based on the remaining activity value of step (iii), said managing preferably comprising at least one of —providing a dosage recommendation based on the remaining activity value of the chemical substance formulation, preferably via an output unit (30); —providing a residual shelf life indicator for said chemical substance formulation based on the remaining activity value of the chemical substance formulation; —automated adjustment of a dosage of the chemical substance formulation by controlling of a dosing equipment; and/or —eliciting an order of a batch of chemical substance for- (Continued)

mulation if the remaining activity value is indicative of the total chemical substance activity in the chemical substance formulation being below a pre-determined threshold value. The present invention also relates to an apparatus for activity based chemical substance formulation management of a chemical substance formulation, comprising: —an input unit (10) configured to receive a data input, preferably a user interface, wherein the data input comprises storage segment data defined by at least temperature and duration and an initial chemical substance activity value of said chemical substance formulation; —a processing unit (20), preferably a processing unit comprising at least one processor, configured, specifically by programming, to determine, specifically to calculate, a remaining activity value of the chemical substance formulation based on the storage segment data and the initial chemical substance activity value; and —an output unit (30) configured to output the remaining activity value for the chemical substance formulation to the user and/or to a data interface; and to a system comprising said apparatus. The present invention further relates to methods, computer programs, data carriers, and uses related to the aforesaid method, apparatus, and system.

18 Claims, 4 Drawing Sheets

(56) References Cited

U.S. PATENT DOCUMENTS

| | | | | |
|---|---|---|---|---|
| 2005/0248455 | A1* | 11/2005 | Pope | G04F 10/00 |
| | | | | 374/E1.004 |
| 2007/0255626 | A1 | 11/2007 | Salomon et al. | |
| 2009/0053724 | A1* | 2/2009 | Roth | C12Q 1/6869 |
| | | | | 435/6.16 |
| 2010/0013599 | A1* | 1/2010 | Tartock | H04Q 9/00 |
| | | | | 340/10.1 |
| 2011/0029413 | A1* | 2/2011 | Ben-Tzur | G06Q 10/087 |
| | | | | 705/28 |
| 2014/0232519 | A1* | 8/2014 | Allen | G06Q 30/0283 |
| | | | | 340/5.9 |
| 2017/0017919 | A1* | 1/2017 | Haimi | G06Q 10/06315 |
| 2017/0066824 | A1* | 3/2017 | Imran | C07K 16/244 |
| 2018/0300671 | A1* | 10/2018 | Richardson | G06Q 10/087 |
| 2018/0320947 | A1* | 11/2018 | Jain | B65D 81/3834 |
| 2018/0342032 | A1* | 11/2018 | Daigle | G06Q 10/08 |
| 2022/0284391 | A1* | 9/2022 | Fischer | G06Q 10/0838 |

FOREIGN PATENT DOCUMENTS

| | | |
|---|---|---|
| JP | 4805786 B2 | 11/2011 |
| WO | WO-2019/175738 A1 | 9/2019 |

OTHER PUBLICATIONS

Qi, Lin, et al. "C2SLDS: A WSN-based perishable food shelf-life prediction and LSFO strategy decision support system in cold chain logistics." Food Control 38 (2014): 19-29. (Year: 2014).*
Angelidis et al., Kinetics of cell reduction in processed cheese during storage, Food Control, 29(1):18-21 (2012).
International Application No. PCT/EP2020/075323, International Search Report and Written Opinion, mailed Dec. 15, 2020.
Valero et al., Survival kinetics of Listeria monocytogenes on raw sheep milk cured cheese under different storage temperatures, Int. J. Food Microbiol., 184:39-44 (2014).

* cited by examiner

ACTIVITY BASED CHEMICAL SUBSTANCE INVENTORY MANAGEMENT

CROSS-REFERENCE TO RELATED APPLICATIONS

This is the U.S. national phase of International Application No. PCT/EP2020/075323, filed Sep. 10, 2020, which claims the benefit of European Patent Application No. 19206287.5, filed on Oct. 30, 2019.

The present invention relates to a computer-implemented method for activity based chemical substance formulation management of a chemical substance formulation comprising (i) receiving input data, preferably via an input unit, of at least one storage segment data defined by at least temperature and storage duration and an initial chemical substance activity value of said chemical substance formulation; (ii) determining, specifically calculating, a remaining activity value of the chemical substance formulation based on the storage segment data and the initial chemical substance activity value via a processing unit; (iii) providing a remaining activity value for the chemical substance formulation, preferably via an output unit, and (iv) managing said chemical substance formulation based on the remaining activity value of step (iii), said managing preferably comprising at least one of —providing a dosage recommendation based on the remaining activity value of the chemical substance formulation, preferably via an output unit; —providing a residual shelf life indicator for said chemical substance formulation based on the remaining activity value of the chemical substance formulation; —automated adjustment of a dosage of the chemical substance formulation by controlling of a dosing equipment; and/or —eliciting an order of a batch of chemical substance formulation if the remaining activity value is indicative of the total chemical substance activity in the chemical substance formulation being below a pre-determined threshold value. The present invention also relates to an apparatus for activity based chemical substance formulation management of a chemical substance formulation, comprising: —an input unit configured to receive a data input, preferably a user interface, wherein the data input comprises storage segment data defined by at least temperature and duration and an initial chemical substance activity value of said chemical substance formulation; —a processing unit, preferably a processing unit comprising at least one processor, configured, specifically by programming, to determine, specifically to calculate, a remaining activity value of the chemical substance formulation based on the storage segment data and the initial chemical substance activity value; and —an output unit configured to output the remaining activity value for the chemical substance formulation to the user and/or to a data interface; and to a system comprising said apparatus. The present invention further relates to methods, computer programs, data carriers, and uses related to the aforesaid method, apparatus, and system.

Inactivation and degradation of chemical substances may be caused by diverse physical and chemical factors and conditions, including but not limited to temperature, humidity, pH value, radiation (such as sunlight and artificial light), corrosion, friction, amount of oxygen which is present, amount of water which is present etc.

Nonetheless, chemical substances degrade upon storage, particularly at different conditions than the recommended storage conditions, especially at higher temperatures than the recommended storage temperature. Moreover, in particular at industrial scale, chemical substance products may be exposed to unfavorable storage conditions upon shipping and/or storage (e.g. unplanned lengthy customs process, technical failures in cooling, unplanned interruption of the logistic chain). In all those cases, the only way to find out whether a product is still sellable or usable is a re-test of activity. A problem associated therewith, however, is that usually warehouses are not equipped and employees are not qualified for sample testing. Since a product may still be usable even when the originally specified minimum activity is not reached, if a defined overdosing compared to original recipe can be applied, it is desirable that the remaining activity of a chemical substance formulation, depending on storage conditions, is known or predictable.

There is, thus, a need in the art to provide reliable means and methods for activity based chemical substance formulation management. In particular, there is a need to provide means and methods avoiding at least in part the drawbacks of the prior art as discussed above.

This problem is solved by the methods, apparatus, system, and uses with the features of the independent claims. Preferred embodiments, which might be realized in an isolated fashion or in any arbitrary combination are listed in the dependent claims.

Accordingly, the present invention relates to a computer-implemented method for activity based chemical substance formulation management of a chemical substance formulation comprising (i) receiving input via an input unit of at least one storage segment data defined by at least temperature and storage duration and an initial chemical substance activity value of said chemical substance formulation;

(ii) determining, specifically calculating, a remaining activity value of the chemical substance formulation based on the storage segment data and the initial chemical substance activity value via a processing unit;

(iii) providing a remaining activity value for the chemical substance formulation, preferably via an output unit; and (iv) managing said chemical substance formulation based on the remaining activity value of step (iii).

The method of the present invention may comprise steps in addition to those explicitly mentioned above. For example, further steps may relate, e.g., to specific steps of managing the chemical substance formulation or combinations of such steps, preferably as indicated herein in the claims and/or the embodiments. Preferably, the method comprises, preferably before performing steps (ii) and (iii), an automated comparison step, wherein the comparison step comprises comparing temperature and/or storage duration values with a respective predefined value, wherein steps (ii) and (iii) are performed in accordance with the result of the comparison step, preferably wherein steps (ii) and (iii) are only executed if temperature and/or storage duration exceeds a respective predefined value. Preferably, the method is used in any process using a specified chemical substance activity, e.g. for chemical substance dosing, for example in biochemical or chemical production processes, in the field of crop protection and fertilization, in seed treatment, in cleaning processes (e.g. in a washing machine, a dishwasher, hard surface cleaning, or an industrial laundry machine), in food (e.g. milk, or meat) processing, in animal feed processing, in biofuel production, in leather production, in textile production, in pulp and paper industry, in beverage production, in chemical production processes, in water treatment, and/or in the field of human and veterinary medicine etc.

Moreover, the method may be preceded by steps establishing a model of chemical substance stability, e.g. by a method for providing a stability model for a chemical substance formulation, comprising e.g. the steps of (I) storing aliquots of a chemical substance solution under at least three different values of at least one storage parameter, preferably storage temperature, (II) determining residual chemical substance activity in said aliquots at least two non-identical points in time after start of storage, (II) modeling said non-identical points in time and said values of the storage parameter into a stability model, preferably based on the Arrhenius equation and/or on a Weibull model, preferably as specified herein below, and, thereby (IV) providing a stability model. Moreover, the data from the stability model may be provided in a database, preferably tangibly embedded into a data carrier, comprising an identification code for at least one chemical substance formulation and, allocated thereto, at least the parameters required for determining a remaining activity value of a chemical substance formulation. As will be understood by the skilled person, the aforesaid method for providing a stability model preferably precedes the computer-implemented method for activity based chemical substance formulation management and, also preferably, is performed only once to establish the model and, preferably, include the required parameters into the aforesaid database.

Referring to the computer-implemented aspects of the invention, one or more of the method steps, preferably all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements of chemical substance activity.

Specifically, further disclosed herein are:
a computer or computer network comprising at least one processor, wherein the processor is adapted to perform the method according to one of the embodiments described in this description,
a computer loadable data structure that is adapted to perform the method according to one of the embodiments described in this description while the data structure is being executed on a computer,
a computer program, wherein the computer program is adapted to perform the method according to one of the embodiments described in this description while the program is being executed on a computer,
a computer program comprising program means for performing the method according to one of the embodiments described in this description while the computer program is being executed on a computer or on a computer network,
a computer program comprising program means according to the preceding embodiment, wherein the program means are stored on a storage medium readable to a computer,
a storage medium, wherein a data structure is stored on the storage medium and wherein the data structure is adapted to perform the method according to one of the embodiments described in this description after having been loaded into a main and/or working storage of a computer or of a computer network, and
a computer program product having program code means, wherein the program code means can be stored or are stored on a storage medium, for performing the method according to one of the embodiments described in this description, if the program code means are executed on a computer or on a computer network.

The devices and methods according to the present invention have several advantages over known methods for activity based chemical substance formulation management. The use of a computer-implemented method, preferably automatically obtaining storage segments data, e.g. via a network, may allow to analyze a large amount of complex input data and may to deliver fast, reliable and accurate results.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, as used in the following, the terms "preferably", "more preferably", "most preferably", "particularly", "more particularly", "specifically", "more specifically" or similar terms are used in conjunction with optional features, without restricting further possibilities. Thus, features introduced by these terms are optional features and are not intended to restrict the scope of the claims in any way. The invention may, as the skilled person will recognize, be performed by using alternative features. Similarly, features introduced by "in an embodiment" or similar expressions are intended to be optional features, without any restriction regarding further embodiments of the invention, without any restrictions regarding the scope of the invention and without any restriction regarding the possibility of combining the features introduced in such way with other optional or non-optional features of the invention.

As used herein, if not otherwise indicated, the term "about" relates to the indicated value with the commonly accepted technical precision in the relevant field, preferably relates to the indicated value ±20%, more preferably ±10%, most preferably ±5%. Further, the term "essentially" indicates that deviations having influence on the indicated result or use are absent, i.e. potential deviations do not cause the indicated result to deviate by more than ±20%, more preferably ±10%, most preferably ±5%. Thus, "consisting essentially of" means including the components specified but excluding other components except for materials present as impurities, unavoidable materials present as a result of processes used to provide the components, and components added for a purpose other than achieving the technical effect of the invention. For example, a composition defined using the phrase "consisting essentially of" encompasses any known acceptable additive, excipient, diluent, carrier, and the like. Preferably, a composition consisting essentially of a set of components will comprise less than 5% by weight, more preferably less than 3% by weight, even more preferably less than 1%, most preferably less than 0.1% by weight of non-specified component(s).

The term "chemical substance", as used herein, includes, without limitation, any type of chemical substance having an activity as specified herein below. The chemical substance, preferably, is a chemical compound. A chemical compound is a chemical substance composed of many identical molecules (or molecular entities) composed of atoms from more than one element held together by chemical bonds. Preferably, the chemical compound is a molecule. More preferably, the chemical compound is an organic molecule.

The "activity" of a chemical substance, as referred to herein, can be any type of chemical, biochemical and/or biological activity, including for example a catalytic activity. The term activity, as the skilled person will understand, may relate to the specific activity, i.e. the activity per mass unit, e.g. units/mg of the chemical substance or units/mol of the chemical substance. The activity may, however, be a volume activity, i.e. the activity per volume of chemical substance solution, e.g. units/ml solution; moreover, activity may also be the absolute activity, i.e. the activity comprised in a given formulation, e.g. units. As will be understood by the skilled person, a decrease in activity, preferably is a decrease in specific activity; Preferably, with an unchanged amount of formulation, this will correlate with a decrease in absolute activity; and, with an unchanged dilution, will also correlate with a decrease in volume activity. Thus, provided total amount of formulation and/or dilution are not modified, decrease in activity may be determined as a total, activity, a volume activity, or specific activity. Preferably, activity is determined as specific activity and/or absolute activity, more preferably as specific activity. In accordance, an "initial chemical substance activity value" is an activity value of a chemical substance formulation determined at or before start of storage, preferably before the first storage segment; more preferably determined shortly before start of storage, e.g. at most 10 days before start of storage, preferably at most 5 days before start of storage, more preferably at most 2 days before start of storage, most preferably at most 1 day before start of storage. Means and methods for determining an initial chemical substance activity value are known to the skilled person. Preferably, the initial chemical substance activity value is determined by an assay or a quick analysis tool testing the activity of the chemical substance. Preferably, the chemical substance activity value is determined by measuring certain physicochemical parameters such as the pH value. Also in accordance, the term "remaining activity value", as used herein, relates to an activity value of a chemical substance formulation determined at or after the end of storage, preferably after the last storage segment; more preferably the remaining activity value is determined shortly before deciding on and/or applying at least one management measure as specified elsewhere herein, e.g. at most 10 days, preferably at most 5 days, more preferably at most 2 days, most preferably at most 1 day before deciding on and/or applying at least one management measure. Means and methods for determining a remaining activity value are described herein below and in the Examples.

The term "chemical substance formulation", as used herein, includes, without limitation, any type of formulation comprising at least one chemical substance having an activity. Thus, the formulation may be liquid or solid, may be a solution, an emulsion, a suspension, a sol, a gel, or a solid. Preferably, the formulation is a solution, an emulsion, or a suspension, more preferably is a solution. Preferably, the formulation comprises additional compounds in addition to the chemical substance, in particular buffer compounds, salts, stabilizers, solvents, and the like. Also preferably, the chemical substance formulation is a chemical substance solution, preferably an aqueous solution, more preferably a buffered solution. Thus, preferably, the chemical substance formulation further comprises water. The chemical substance formulation may comprise more than one chemical substance and/or more than one activity, i.e. may comprise a plurality of chemical substances and/or activities which may be affected by storage segments differently. Preferably, in such case, the management measures are based on the chemical substance and/or activity showing the strongest decrease in activity; more preferably, the management measures are based on the activity showing the strongest decrease in such case.

The term "chemical substance formulation management", as used herein, relates to any measure relating to further use of a chemical substance formulation, the term "activity-based" indicating that the decision on the further measure is taken taking into account the activity of the chemical substance formulation, in particular the remaining activity as specified herein below. Depending on the remaining activity, management of a chemical substance formulation may include use as planned, use at a modified dosage (e.g. at a higher volume to compensate for loss in volume activity) or recommending such a use at a higher dosage, use for a different purpose (e.g. a purpose allowing lower specific and/or volume activities), readjusting a residual shelf life indicator (e.g. a use by, or a best before date) or may even be discarding and/or returning to the manufacturer the chemical substance formulation. Moreover, the management may include ordering an additional and/or fresh batch of the chemical substance formulation, e.g. in case it is determined that the absolute activity of the batch received is too low for the planned purpose. Moreover, the management may include eliciting quality control measures adapted to avoid activity decrease for further batches, such as improvement in shipping conditions, in particular shipping duration and/or shipping temperature, but also e.g. improvements in packaging or including pre-purification steps and/or conservation measures before shipping. In a preferred embodiment, chemical substance formulation management is management of an chemical substance formulation having been exposed to a multitude of, i.e. preferably at least two, more preferably at least three, even more preferably at least five, non-identical storage segments differing at least in temperature.

The term "storage segment", as used herein, relates to any sub-section of a storage history of a chemical substance formulation. Preferably, the storage segment is a shipment segment, e.g. segments may be any of storage at the manufacturer site, shipping via ship, ship, and/or plane, storage at customs, and/or storage at recipient's site. A storage segment may, however, also be a temperature segment, i.e., preferably, a segment of essentially constant temperature affecting the chemical substance formulation for a time period. Preferably, the shipment segments correlate with the temperature segments. In a preferred embodiment, the storage segment is non-temperature controlled, is temperature controlled within a specific target range, or is controlled such as not to exceed a pre-determined reference value. Thus, preferably, in at least one storage segment, the temperature affecting the chemical substance formulation for said time period is not controlled. More preferably, in at least two, still more preferably at least threes, even more preferably at least five, most preferably all, storage segments, the temperature affecting the chemical substance formulation for said time period is not adjusted. Even more preferably, the chemical substance formulation is not cooled and/or heated during at least one, preferably at least two, even more preferably at least three, still more preferably at least five, most preferably all, storage segment(s).

In accordance, the term "storage segment data", as used herein, are data allocated to a specific storage segment. Preferably, the storage segment data at least comprise data on duration and temperature of the storage segment. Measures and devices for determining temperature acting on a specific object such as a chemical substance formulation and its duration, in particular appropriate sensors, are known in the art. Thus, preferably, the storage segment data is determined based on sensor data. Preferably, the sensor data is recorded using a sensor in close proximity or within the chemical substance formulation during at least one storage segment, preferably during the complete storage term. Also preferably, the sensor is located within the same storage space as the chemical substance formulation and/or is attached to a packaging, a pallet, or an outer shell of a container of the chemical substance formulation; preferably, in such case, the sensor data is corrected, specifically by one or both of the receiving unit and the processing unit as specified herein below, by calculating the temperature within the chemical substance formulation, preferably by taking into account heat conductivity, in particular based on mass and heat capacity of the chemical substance formulation. More preferably, the sensor data is received, specifically by one or both of the receiving unit and the processing unit, from at least one sensor located within the chemical substance formulation. Preferably, storage segment data are determined and provided semi-quantitatively or quantitatively, more preferably quantitatively. Semi-quantitative determination and provision of storage segment data may comprise reporting temperature and/or duration as a category, e.g. low (e.g. <15° C.), medium (15° C.≤temperature≤35° C.), and high (>35° C.) for temperature, and e.g. short (<1 h), medium (1 h≤duration≤1 day), and long (>1 day) for duration. Quantitative determination and provision of storage segment data preferably comprises reporting temperature and/or duration in appropriate graduations, e.g. preferably, 1° C. graduation for temperature and 1 min or 1 h graduation for duration. As the skilled person understands, for long (preferably >5 min, >15 min, or >30 min) storage segments, preferably an average temperature is determined and reported. Preferably, storage segment data may also be determined by determining a surrogate marker correlating with temperature and duration of a storage segment, e.g. using a temperature sensitive dye changing color with increasing temperature and/or duration, Or, in case the chemical substance formulation comprises more than one activity, using one activity as a surrogate marker for one or more activities comprised in the formulation.

The term "input data" as used herein is a broad term and is to be given its ordinary and customary meaning to a person of ordinary skill in the art and is not to be limited to a special or customized meaning. The term preferably refers to at least storage segment data as specified herein above and to an initial chemical substance activity value. Preferably, input data comprises further data, preferably data identifying the chemical substance formulation and/or providing essential parameters and an identifier for the stability model applicable to the chemical substance formulation in question. Thus, in case the Arrhenius equation as specified herein below shall be used as a chemical substance stability model, preferably parameters $A_0$, $k_0$, and $E_{a'}$ are provided as input data; or preferably, in case a Weibull model shall be used as a chemical substance stability model, preferably parameters $A_0$, $k_0$, $E_{a'}$ and n are provided as input parameters. As the skilled person will understand, the input data may also comprise the equation(s) of the stability model itself, preferably including all essential parameters. It is, however, also envisaged that a stability model, preferably including chemical substance formulation-specific parameters, is comprised in the device into which the method is implemented, e.g. in a memory unit operably connected to the processing unit; as will be understood by the skilled person, in case the device comprises models and/or parameters for more than one chemical substance formulation, the input data preferably comprise an identifier of the chemical substance formulation enabling the processing unit to use the correct stability model and parameters. In a preferred embodiment, the input data further comprise a time-varying temperature parameter. Thus, in a preferred embodiment, input data comprise storage segment data from a multitude, preferably at least two, more preferably at least three, even more preferably at least five, storage segments of non-identical storage temperature, and, more preferably, said storage segment data from said non-identical storage segments comprise a time-varying temperature parameter.

The term "input unit", as used herein, includes without limitation any item or element forming a boundary configured for transferring information. In particular, the input unit may be configured for transferring information onto a computational device, e.g. onto a computer, such as to receive information. The input unit preferably is a separate unit configured for receiving or transferring information onto a computational device, e.g. one or more of: an interface, specifically a web interface and/or a data interface; a keyboard; a terminal; a touchscreen, or any other input device deemed appropriate by the skilled person. More preferably, the input unit comprises or is a data interface configured for transferring or exchanging information as specified herein below.

The term "output unit", as used herein, includes without limitation any item or element forming a boundary configured for transferring information. In particular, the output unit may be configured for transferring information from a computational device, e.g. a computer, such as to send or output information, e.g. onto another device or to a user. The output unit preferably is a separate unit configured for outputting or transferring information from a computational device, e.g. one or more of: an interface, specifically a web interface and/or a data interface; a screen, a printer, or a touchscreen, or any other output device deemed appropriate by the skilled person. More preferably, the output unit comprises or is a data interface configured for transferring or exchanging information as specified herein below.

Preferably, the input unit and the output unit are configured as at least one or at least two separate data interface(s); i.e. preferably, provide a data transfer connection, e.g. a wireless transfer, an internet transfer, Bluetooth, NFC, inductive coupling or the like. As an example, the data transfer connection may be or may comprise at least one port comprising one or more of a network or internet port, a USB-port and a disk drive. The input unit and/or the output unit may also be may be at least one web interface.

The term "processing unit" as used herein is a broad term and is to be given its ordinary and customary meaning to a person of ordinary skill in the art and is not to be limited to a special or customized meaning. The term specifically may refer, without limitation, to an arbitrary logic circuitry configured for performing operations of a computer or system, and/or, generally, to a device or unit thereof which is configured for performing calculations or logic operations. The processing unit may comprise at least one processor. In particular, the processing unit may be configured for processing basic instructions that drive the computer or system. As an example, the processing unit may comprise at least one arithmetic logic unit (ALU), at least one floating-point unit (FPU), such as a math coprocessor or a numeric coprocessor, a plurality of registers and a memory, such as a cache memory. In particular, the processing unit may be a multi-core processor. The processing unit may comprise a Central Processing Unit (CPU) and/or one or more Graphics Processing Units (GPUs) and/or one or more Application Specific Integrated Circuits (ASICs) and/or one or more Tensor Processing Units (TPUs) and/or one or more field-programmable gate arrays (FPGAs) or the like. The processing unit may be configured for pre-processing the input data. The pre-processing may comprise at least one filtering process for input data fulfilling at least one quality criterion. For example, the input data may be filtered to remove missing variables. Preferably, input data may be compared to at least one pre-defined threshold value, e.g. a threshold temperature, to determine whether method step (ii) is required to be performed at all. Preferably, the processing unit is configured to perform a determination, preferably calculation, of a remaining chemical substance activity as specified elsewhere herein.

Methods for determining a remaining activity value of a chemical substance formulation based on the storage segment data and the initial chemical substance activity value are in principle known in the art. Preferably, said determining is based on previously established experimental data on the decrease of the activity of the chemical substance formulation in question in dependence on temperature and/or time. Preferably, the experimental data are condensed into a model of chemical substance stability. More preferably, the experimental data are modeled into at least two models of chemical substance stability, the prediction accuracy of the two models is compared, and the model providing accuracy prediction of the stability of the chemical substance formulation in question is selected for the determining step of the computer-implemented method for activity based chemical substance formulation management, i.e. preferably step (ii) of the method.

Preferably, the model for chemical substance stability comprises, more preferably is, the Arrhenius equation; thus, the stability model preferably comprises equation (I)

$$A(t, T) = A_0 \cdot \exp\left(-k_0 \exp\left(-\frac{E_a}{R}\left(\frac{1}{T} - \frac{1}{T_{ref}}\right)\right)t\right) \quad (I)$$

With the following definitions:
$A(t,T)$=remaining chemical substance activity after storage time t at temperature T;
$A_0$=initial chemical substance activity;
t=time, i.e. storage duration at temperature T;
T=storage temperature (in Kelvin)
R=8.314 J/(K mol), i.e. universal gas constant;
$E_a$=activation energy
$k_0$=frequency factor
$T_{ref}$=reference temperature for frequency factor k0.

Preferably, $T_{ref}$ is e.g. set arbitrarily to a value of 318.15 K (45° C.) and has no influence on fit or prediction. Also preferably, the parameters indicated in bold in formula (I) (i.e. $A_0$, $k_0$, and $E_a$) indicate fit parameters. Also preferably, if experimental data were provided for single temperature only, the activation energy $E_a$ cannot be estimated; in this case, $E_a$=0 may be defined formally, so that the resulting A(t,T) is independent of T.

In the case of a storage scenario with non-constant, i.e., time-varying, temperature T, model equation (I) is generalized to $$A(t, \{T(\tau), \tau \in \{0, t\}\}) = A_0 \cdot \exp\left(-\int_0^t k_0 \exp\left(-\frac{E_a}{R}\left(\frac{1}{T(\tau)} - \frac{1}{T_{ref}}\right)\right) d\tau\right)$$

More preferably, the model for chemical substance stability comprises, more preferably is, at least one Weibull-type equation, still more preferably at least one temperature-dependent Weibull type equation. Also more preferably, the stability model comprises, more preferably is, a Weibull-model, still more preferably a temperature-dependent Weibull model.

In a preferred embodiment, the stability model comprises a time-varying temperature parameter $T(\tau)$, preferably incorporates the effect of a time-varying temperature into the model. In accordance, the stability model preferably (i) enables prediction of degradation in case of time-varying storage temperatures, preferably in case at least one storage segment is a storage segment in which storage temperature is not controlled; (i) uses a single set of parameter values for all temperatures over all storage segments only; and/or (iii) enables use of experimental data with non-constant temperature profiles for establishing the stability model for an enzyme of interest.

Thus, the stability model preferably comprises equation (II)

$$A(t, T) = A_0 \cdot \exp\left(-\left[k_0 \exp\left(-\frac{E_a}{R}\left(\frac{1}{T} - \frac{1}{T_{ref}}\right)\right)t\right]^n\right) \quad (II)$$

with the same definitions as provided above for formula (I) and the additional definition
n=Weibull parameter.

Preferably, $T_{ref}$ is e.g. set arbitrarily to a value of 318.15 K (45° C.) and has no influence on fit or prediction. Also preferably, the parameters indicated in bold in formula (II) (i.e. $A_0$, $k_0$, $E_a$, and n) indicate fit parameters. Also preferably, if experimental data were provided for single temperature only, the activation energy $E_a$ cannot be estimated; in this case, $E_a$=0 may be defined formally, so that the resulting A(t,T) is independent of T.

In the case of a storage scenario with non-constant, i.e., time-varying, temperature T, model equation (II) is generalized to $$A(t, \{T(\tau), \tau \in \{0, t\}\}) =$$
$$A_0 \cdot \exp\left(-\int_0^t n\left[k_0 \exp\left(-\frac{E_a}{R}\left(\frac{1}{T(\tau)} - \frac{1}{T_{ref}}\right)\right)\right]^n \tau^{n-1} d\tau\right)$$

As the skilled person will understand, other chemical substance stability models may be used.

Advantageously, it was found in the work underlying that by using chemical substance stability models, the remaining activity of a chemical substance formulation after storage can be exactly be predicted and management of the chemical substance formulation can be adjusted accordingly. Preferably, it was found that all Weibull-type degradation models in the literature refer to a fixed temperature only, and the advantage of using a temperature-dependent extension is (i) that a temperature-dependent model allows for a prediction of degradation in case of time-varying storage temperatures, which is particularly advantageous in shipping scenarios without strict temperature control; (ii) that even in the case of time-constant temperature, the above model is advantageous, as it requires a single set of parameter values for all temperatures only, which is in contrast to temperature-independent models, which require a separate parameter set for each temperature value of interest; therefore, a temperature-dependent model requires less experimental data points to reliably fit the model parameters for usage in scenarios with time-constant (but variable) temperatures; and (iii) that experiments with non-constant temperature profiles can be used for parameter identification.

The definitions made above apply mutatis mutandis to the following. Additional definitions and explanations made further below also apply for all embodiments described in this specification mutatis mutandis.

The present invention further relates to an apparatus for activity based chemical substance formulation management of a chemical substance formulation, comprising:

an input unit configured to receive a data input, preferably a user interface, wherein the data input comprises storage segment data defined by at least temperature and duration and an initial chemical substance activity value of said chemical substance formulation;

a processing unit, preferably a processing unit comprising at least one processor, configured, specifically by programming, to determine, specifically to calculate, a remaining activity value of the chemical substance formulation based on the storage segment data and the initial chemical substance activity value; and an output unit configured to output the remaining activity value for the chemical substance formulation to the user and/or to a data interface.

The term "apparatus", as used herein, relates to a system of means comprising at least the aforementioned means operatively linked to each other as to allow the determination. Typical input and output units and means for carrying out the determination, in particular processing units, are disclosed above in connection with the methods of the invention. How to link the means in an operating manner will depend on the type of means included into the device. The person skilled in the art will realize how to link the means without further ado. Preferably, the means are comprised by a single apparatus. Typical apparatuses are those which can be applied without the particular knowledge of a specialized technician, in particular hand-held devices comprising an executable code, in particular an application, performing the determinations as specified elsewhere herein. The results may be given as output of raw data which need interpretation e.g. by a technician. More preferably, the output of the apparatus is, however, processed, i.e. evaluated, raw data, the interpretation of which does not require a technician. Also preferably, some functions of activity based chemical substance formulation management may be performed automatically, i.e. preferably without user interaction, e.g. adjustment of a dosage of the chemical substance formulation, or eliciting an order of a batch of chemical substance formulation if the remaining activity value is indicative of the total chemical substance activity in the chemical substance formulation being below a pre-determined threshold value. Further typical devices comprise the units, in particular the input unit, the processing unit, and the output unit referred to above in accordance with the method of the invention.

The input unit of the device may be configured to retrieve input data from a local storage device, e.g. a USB storage device or a sensor having stored storage segment data during storage and/or transport. The input device may, however, also receive input data from an external data storage means or directly from a sensor, e.g. via a data connection such as the internet.

The apparatus preferably is a handheld device or any type of computing device having the features as specified. The apparatus may, however, also be an apparatus configured to make use of a chemical substance formulation, more preferably a washing machine, a dishwasher, an industrial laundry machine, a food (e.g. milk, or meat) processing machine, an animal feed processing machine, a biofuel production machine, a leather production machine, a textile production machine, a pulp and paper production machine, a beverage production machine, a chemical production machine, a chemical processing machine, or an agricultural machine (e.g. a tractor). The apparatus configured to make use of a chemical substance formulation, preferably, further comprises a container unit configured to store a chemical substance formulation; and a dosage unit configured to dose an amount of the chemical substance formulation comprised in the container unit during a processing or production cycle based on the remaining activity value determined by the processing unit.

In addition to the chemical substance formulation management measures as specified herein above, the apparatus preferably is configured to further perform at least one of:

download relevant information including quality information, regulatory information, safety data, and/or technical documents;

order chemical substance formulations; and/or provide a user-feedback including usability, information content and/or chemical substance formulation outcome.

The present invention also relates to a system for providing activity based chemical substance inventory management of a chemical substance formulation, comprising:

an apparatus according to the present invention; and a web server configured to interface with a user via a webpage served by the web server and/or an application program;

wherein the system is configured to provide a graphical user interface (GUI) to a user by the webpage and/or the application program.

The term "system" as used herein is a broad term and is to be given its ordinary and customary meaning to a person of ordinary skill in the art and is not to be limited to a special or customized meaning. The term includes, without limitation, any a setup having at least two interacting components. Specifically, the term may include any type of system comprising the components as specified. Preferably, the apparatus comprised in the system is an apparatus as specified herein above. Preferably, the apparatus is a computing device comprising a data interface as an input unit and as an output unit. Thus, preferably, the apparatus comprised in the system preferably is configured to receive input data from an external data storage means or directly from a sensor, e.g. via a data connection such as the internet.

The system is configured to output a remaining chemical substance activity value to an external data storage means and/or processing device, preferably a handheld device or remote computing device, via a web server configured to interface with a user via a webpage served by the web server and/or via an application program, wherein the system is configured to provide a graphical user interface (GUI) to a user by the webpage and/or the application program. Thus, preferably, the server is configured to provide a graphical user interface (GUI) to a user by the webpage and/or the application program. The term "graphical user interface" is known to the skilled person to relate to a user interface allowing a user to interact with an electronic device, in particular an apparatus or other computing device, through visual indicators instead of text-based user interaction, such as typed commands or text navigation. Also the term "application program" abbreviated as "application" or "App", is also known to the skilled person as a computer executable code, in particular a software program providing a graphical user interface for a computing device function or a specific application of a computing device. Preferably, the application program is an executable code opening the web page served by the apparatus as specified elsewhere herein, preferably on a handheld device.

As the skilled person will understand in view of the present description, the web server may serve the remaining activity value of a chemical substance formulation as such; the web server may, however, also provide all parameters required to determine a remaining chemical substance activity. Thus, the web server, preferably, serves to a user at at least one of

- a storage segment data, defined by at least temperature and duration, and an initial chemical substance activity value of said chemical substance formulation;
- the parameters required for determining a remaining activity value of a chemical substance formulation, preferably of a stability model as specified herein above, and an initial chemical substance activity value of said chemical substance formulation; and
- a remaining activity value of the chemical substance formulation, preferably determined according to the method according to the present invention.

The present invention also relates to a computer program comprising instructions which, when the program is executed by the apparatus of the present invention, specifically by a processor of the apparatus, and/or by the system of the present invention, cause the apparatus and/or the system to perform the method of the present invention.

The present invention also relates to a computer-readable storage medium comprising instructions which, when executed by the apparatus of any one of the present invention and/or the system of any one of the present invention, cause the apparatus and/or the system to perform the method of the present invention.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

The present invention also relates to a use of a computer-implemented method according to the present invention and/or a remaining activity value of a chemical substance formulation determined according to the method according the present invention in any processing or production machine (including for example a washing machine or an agricultural machine), preferably for determining dosing of said chemical substance formulation; and to a use of a computer-implemented method according to the present invention in industrial applications such as industrial cleaning applications, crop protection and fertilization applications.

The present invention further relates to a method for manufacturing a product comprising a chemical substance formulation at a pre-defined activity, comprising the steps of the method for activity based chemical substance formulation management of the present invention and the further step of automatically adjusting dosing of said chemical substance formulation based on the remaining activity value of the chemical substance formulation.

The term "product comprising a chemical substance formulation" as used herein is a broad term and is to be given its ordinary and customary meaning to a person of ordinary skill in the art and is not to be limited to a special or customized meaning. In particular, the term includes any type of product comprising a chemical substance formulation, preferably comprising a pre-defined chemical substance activity. Preferably, the product is a product for use in home or industrial cleaning applications, more preferably is a cleaning agent or component thereof.

In view of the above, the following embodiments are particularly envisaged:

Embodiment 1. A computer-implemented method for activity based chemical substance formulation management of a chemical substance formulation comprising
  (i) receiving input data, preferably via an input unit, of at least one storage segment data defined by at least temperature and storage duration and an initial chemical substance activity value of said chemical substance formulation;
  (ii) determining, specifically calculating, a remaining activity value of the chemical substance formulation based on the storage segment data and the initial chemical substance activity value via a processing unit;
  (iii) providing a remaining activity value for the chemical substance formulation, preferably via an output unit, and
  (iv) managing said chemical substance formulation based on the remaining activity value of step (iii).

Embodiment 2. The computer-implemented method of embodiment 1, wherein step (iv) comprises providing a dosage recommendation based on the remaining activity value of the chemical substance formulation, preferably via an output unit.

Embodiment 3. The computer-implemented method of embodiment 1 or 2, wherein step (iv) comprises providing a residual shelf life indicator for said chemical substance formulation based on the remaining activity value of the chemical substance formulation.

Embodiment 4. The computer-implemented method of any one of embodiments 1 to 3, wherein step (iv) comprises automated adjustment of a dosage of the chemical substance formulation by controlling of a dosing equipment.

Embodiment 5. The computer-implemented method of any one of embodiments 1 to 4, wherein step (iv) comprises eliciting an order of a batch of chemical substance formulation if the remaining activity value is indicative of the total chemical substance activity in the chemical substance formulation being below a pre-determined threshold value.

Embodiment 6. The computer-implemented method of any one of embodiments 1 to 5, wherein the at least one storage segment data is determined based on sensor data.

Embodiment 7. The computer-implemented method of embodiment 6, wherein the sensor data is received from a sensor in close proximity or within the chemical substance formulation during at least one storage segment, preferably during the complete storage term.

Embodiment 8. The computer-implemented method of embodiment 7, wherein said sensor is located within the same storage space as the chemical substance formulation and/or is attached to a packaging, a pallet, or an outer shell of a container of the chemical substance formulation.

Embodiment 9. The computer-implemented method of any one of embodiments 6 to 8, wherein the sensor data is corrected, specifically by one or both of the receiving unit and the processing unit, by calculating the temperature within the chemical substance formulation, preferably by taking into account heat conductivity, in particular based on mass and heat capacity of the chemical substance formulation.

Embodiment 10. The computer-implemented method of any one of embodiments 6 to 9, wherein the sensor data is received, specifically by one or both of the receiving unit and the processing unit, from at least one sensor located within the chemical substance formulation.

Embodiment 11. The computer-implemented method of any one of embodiments 6 to 10, wherein the method comprises, preferably before performing steps (ii) and (iii), an automated comparison step, wherein the comparison step comprises comparing temperature and/or storage duration values with a respective predefined value, wherein steps (ii) and (iii) are performed in accordance with the result of the comparison step, preferably wherein steps (ii) and (iii) are only executed if temperature and/or storage duration exceeds a respective predefined value.

Embodiment 12. An apparatus for activity based chemical substance formulation management of a chemical substance formulation, comprising:
 an input unit configured to receive a data input, preferably a user interface, wherein the data input comprises storage segment data defined by at least temperature and duration and an initial chemical substance activity value of said chemical substance formulation;
 a processing unit, preferably a processing unit comprising at least one processor, configured, specifically by programming, to determine, specifically to calculate, a remaining activity value of the chemical substance formulation based on the storage segment data and the initial chemical substance activity value preferably according to the computer-implemented method according to any one of embodiments 1 to 11 or 22 to 25; and
 an output unit configured to output the remaining activity value for the chemical substance formulation to the user and/or to a data interface.

Embodiment 13. The apparatus according to embodiment 13, further configured to perform at least one of the following:
 output, preferably print, the value of the remaining activity value of the chemical substance formulation via the output unit;
 determine by the processing unit and output via the output unit a residual shelf life value of the chemical substance formulation;
 determine by the processing unit and output via the output unit a dosage instruction for the chemical substance formulation; and/or
 automatically elicit an order of an additional batch of chemical substance formulation if the remaining activity value indicates that the total chemical substance activity in the chemical substance formulation is below a pre-determined threshold value.

Embodiment 14. The apparatus according to embodiment 13, further configured to:
 download relevant information including quality information, regulatory information, safety data, and/or technical documents;
 order chemical substance formulations; and/or
 provide a user-feedback including usability, information content and/or chemical substance formulation outcome.

Embodiment 15. The apparatus according to any one of embodiments 12 to 14, wherein said apparatus is an agricultural machine and further comprises
 a container unit configured to store a chemical substance formulation; and
 a dosage unit configured to dose an amount of the chemical substance formulation comprised in the container unit during a crop protection application cycle or fertilization cycle based on the remaining activity value determined by the processing unit.

Embodiment 15a. The apparatus according to any one of embodiments 12 to 14, wherein said apparatus is a washing machine and further comprises
 a container unit configured to store a chemical substance formulation; and
 a dosage unit configured to dose an amount of the chemical substance formulation comprised in the container unit during a wash cycle based on the remaining activity value determined by the processing unit.

Embodiment 16. A system for providing activity based chemical substance inventory management of a chemical substance formulation, comprising:
 an apparatus according to any one of embodiments 12 to 15a; and
 a web server configured to interface with a user via a webpage served by the web server and/or via an application program;
 wherein the system is configured to provide a graphical user interface (GUI) to a user by the webpage and/or the application program.

Embodiment 17. The system of embodiment 16, wherein said web server serves to the user at least one of
 a storage segment data, defined by at least temperature and duration, and an initial chemical substance activity value of said chemical substance formulation;
 the parameters required for determining a remaining activity value of a chemical substance formulation and an initial chemical substance activity value of said chemical substance formulation; and
 a remaining activity value of the chemical substance formulation, preferably determined according to the method according to any one of embodiments 1 to 11 or 24 to 27.

Embodiment 18. A computer program comprising instructions which, when the program is executed by the apparatus of any one of embodiments 12 to 15a, specifically by a processor of the apparatus, and/or by the system of any one of embodiments 16 or 17, cause the apparatus and/or the system to perform the method of any one of embodiments 1 to 11 or 24 to 27.

Embodiment 19. A computer-readable storage medium comprising instructions which, when executed by the apparatus of any one of embodiments 12 to 15a and/or the system of any one of embodiments 16 or 17, cause the apparatus and/or the system to perform the method of any one of embodiments 1 to 11 or 24 to 27.

Embodiment 20. Use of a computer-implemented method according to any of embodiments 1 to 11 and/or a remaining activity value of a chemical substance formulation determined according to the method according to any one of embodiments 1 to 11 or 24 to 27 in a washing machine, preferably for determining dosing of said chemical substance formulation.

Embodiment 21. Use of a computer-implemented method according to any of embodiments 1 to 11 or 24 to 27 and/or a remaining activity value of a chemical substance formulation determined according to the method according to any one of embodiments 1 to 11 in an agricultural machine, preferably for determining dosing of said chemical substance formulation.

Embodiment 22. Use of a computer-implemented method according to any of embodiments 1 to 11 in an industrial application, preferably in biochemical or chemical production processes, in the field of crop protection and fertilization, in seed treatment, in laundry and cleaning processes (e.g. in a washing machine, a dishwasher, or an industrial laundry machine), in food (e.g. milk, or meat) processing, in animal feed processing, in biofuel production, in leather production, in textile production, in pulp and paper industry, in beverage production, in chemical production processes, in water treatment, and/or in the field of human and veterinary medicine etc.

Embodiment 23. Method for manufacturing a product comprising a chemical substance formulation at a pre-defined activity, comprising the steps of the method of any one of embodiments 1 to 11 and the further step of automatically adjusting dosing of said chemical substance formulation based on the remaining activity value of the chemical substance formulation.

Embodiment 24: The computer-implemented method of any one of embodiments 1 to 11, wherein said chemical substance formulation is exposed to a multitude of non-identical storage segments differing at least in temperature.

Embodiment 25. The computer-implemented method of any one of embodiments 1 to 11 or 24, wherein at the temperature of at least one storage segment is not controlled.

Embodiment 26. The computer-implemented method of any one of embodiments 1 to 11, 24, or 25, wherein in step (ii) the remaining activity value of the chemical substance formulation is calculated based on a model comprising a time-varying temperature parameter.

Embodiment 27. The computer-implemented method of any one of embodiments 1 to 11 or 24 to 26, wherein said model comprises at least one temperature-dependent Weibull type equation.

All references cited in this specification are herewith incorporated by reference with respect to their entire disclosure content and the disclosure content specifically mentioned in this specification.

The following Examples shall merely illustrate the invention. They shall not be construed, whatsoever, to limit the scope of the invention.

EXAMPLE 1

Figure 1:
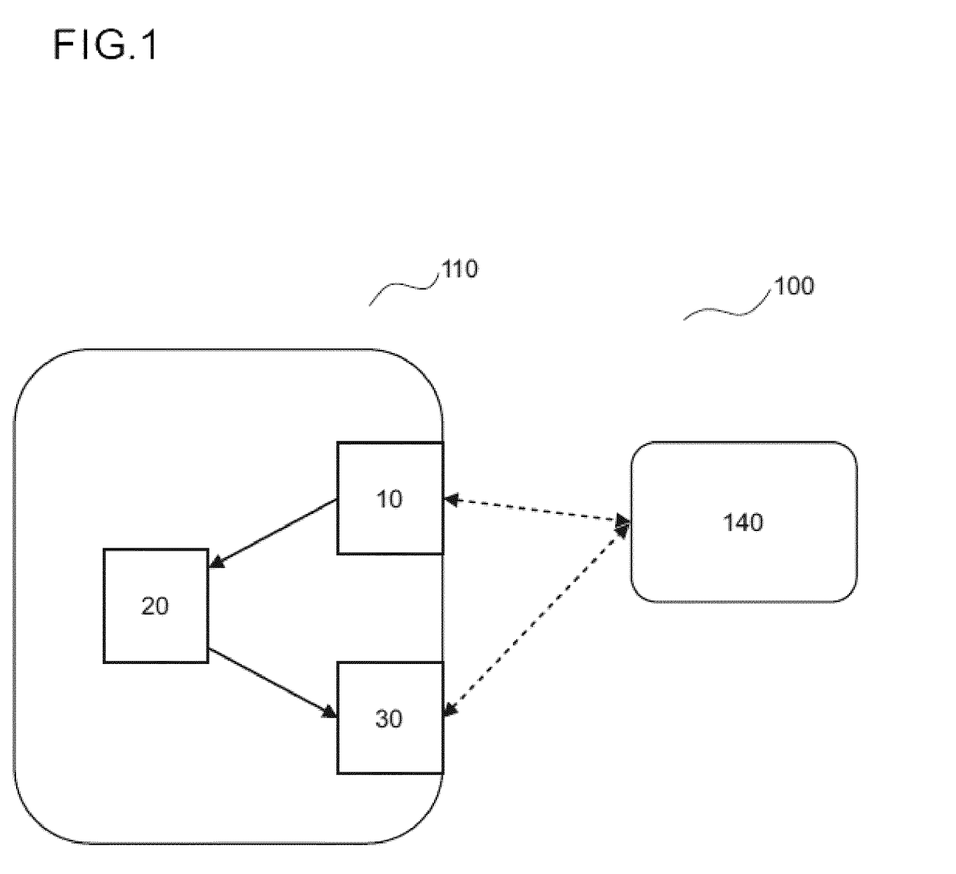
FIG. 1: Device/system

As shown in FIG. 1, a system 100 for providing activity based chemical substance inventory management of a chemical substance formulation is disclosed. The system 100 comprises an apparatus 110 for activity based chemical substance formulation management of a chemical substance formulation and, further, a web server 140 configured to interface with a user via a webpage served by the web server and/or via an application program. The apparatus 110 comprises an input unit 10, a processing unit 20, and an output unit 30. In the system 100, the web server 140 may communicate with the input unit 10 and/or the output unit 30.

Apparatus 110 comprises at least one processing unit 20 such as a processor, microprocessor, or computer system, in particular for executing a logic in a given algorithm. The apparatus 110 may be configured for performing and/or executing at least one computer program of the present description. The processing unit 30 may comprise at least one processor. In particular, the processing unit 30 may be configured for processing basic instructions that drive the computer or system. As an example, the processing unit 30 may comprise at least one arithmetic logic unit (ALU), at least one floating-point unit (FPU), such as a math co-processor or a numeric coprocessor, a plurality of registers and a memory, such as a cache memory. In particular, the processing unit 30 may be a multi-core processor. The processing unit 30 may be configured for machine learning. The processing unit 30 may comprise a Central Processing Unit (CPU) and/or one or more Graphics Processing Units (GPUs) and/or one or more Application Specific Integrated Circuits (ASICs) and/or one or more Tensor Processing Units (TPUs) and/or one or more field-programmable gate arrays (FPGAs) or the like.

The apparatus comprises at least one communication interface, preferably an output unit 30, configured for outputting data. The communication interface may be configured for transferring information from a computational device, e.g. a computer, such as to send or output information, e.g. onto another device. Additionally or alternatively, the communication interface may be configured for transferring information onto a computational device, e.g. onto a computer, such as to receive information, i.e. may be an input unit 10. The communication interface may specifically provide means for transferring or exchanging information. In particular, the communication interface may provide a data transfer connection, e.g. Blue-tooth, NFC, inductive coupling or the like. As an example, the communication interface may be or may comprise at least one port comprising one or more of a network or internet port, a USB-port and a disk drive. The communication interface may be at least one web interface. The input data comprises storage segment data as specified herein above.

The processing unit 20 may be configured for pre-processing the input data. The pre-processing unit 20 may comprise at least one filtering process for input data fulfilling at least one quality criterion. The processing unit 20 is configured for determining at least one remaining chemical substance activity, preferably as specified herein above and below in the further Examples.

The web server 140 is configured to provide a GUI for the apparatus 110. Thus, the web server may exchange data with the output unit 30, e.g. for displaying said data on the GUI. The web server 140 may, however, also exchange data with the input unit of the apparatus, e.g. information on the chemical substance stability model to use and/or to input an initial chemical substance activity value.

EXAMPLE 2

Figure 2:
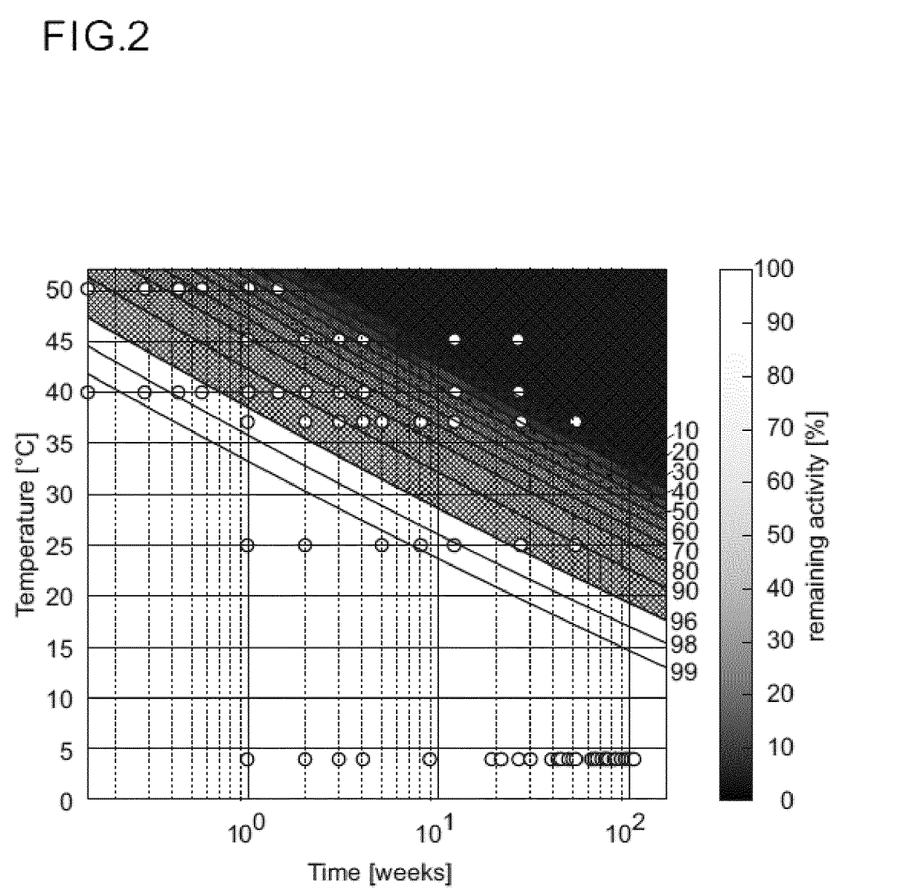
FIG. 2: Fit of chemical substance activity data into a Weibull model; x-axis: time; y-axis: storage temperature; remaining activity is shown in greyscale shading.

A chemical substance formulation for an industrial application purpose (e.g. crop protection purpose or washing purpose) was stored for various time periods at various temperatures. The remaining activity values were fit into a Weibull model (FIG. 2). The specific parameters of the model obtained for the specific chemical substance formulation were:

$A_0$=99.5%
$k_0$=0.0376 days$^{-1}$
$E_a$=182.1 kJ/mol
n=1.15
$T_{ref}$=318.15 K (45° C.)

EXAMPLE 3

Figure 3:
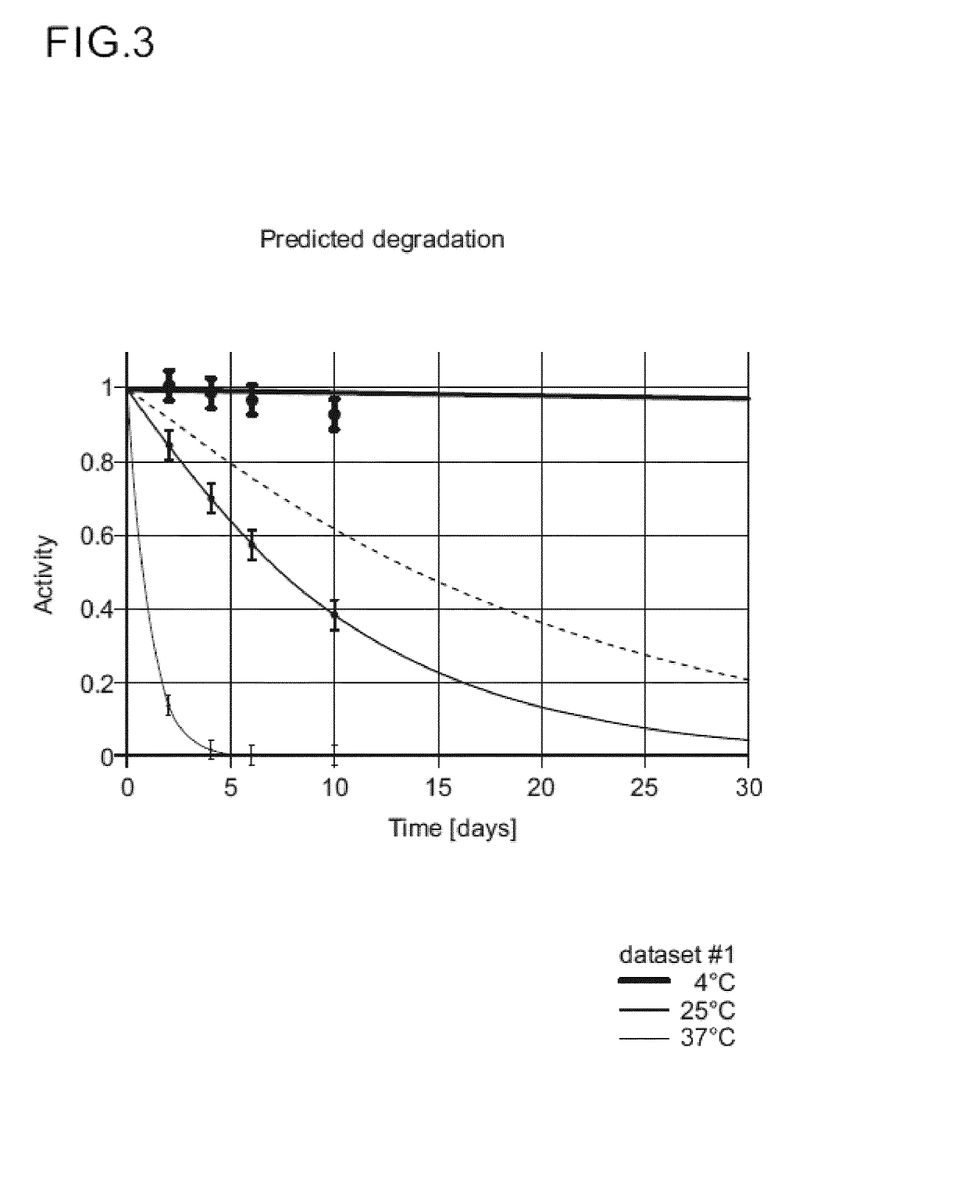
FIG. 3: Exemplary embodiment of a web-based user interface for prediction of remaining chemical substance activity.

A web interface for user interaction may be configured as exemplarily shown in FIG. 3. The web page allows selection between chemical substance stability models, shows fit of remaining activity data into the model, and may allow to select a storage temperature and a storage duration. As will be understood, it is also possible to include a plurality of storage segments into such a web interface.

EXAMPLE 4

Figure 4:
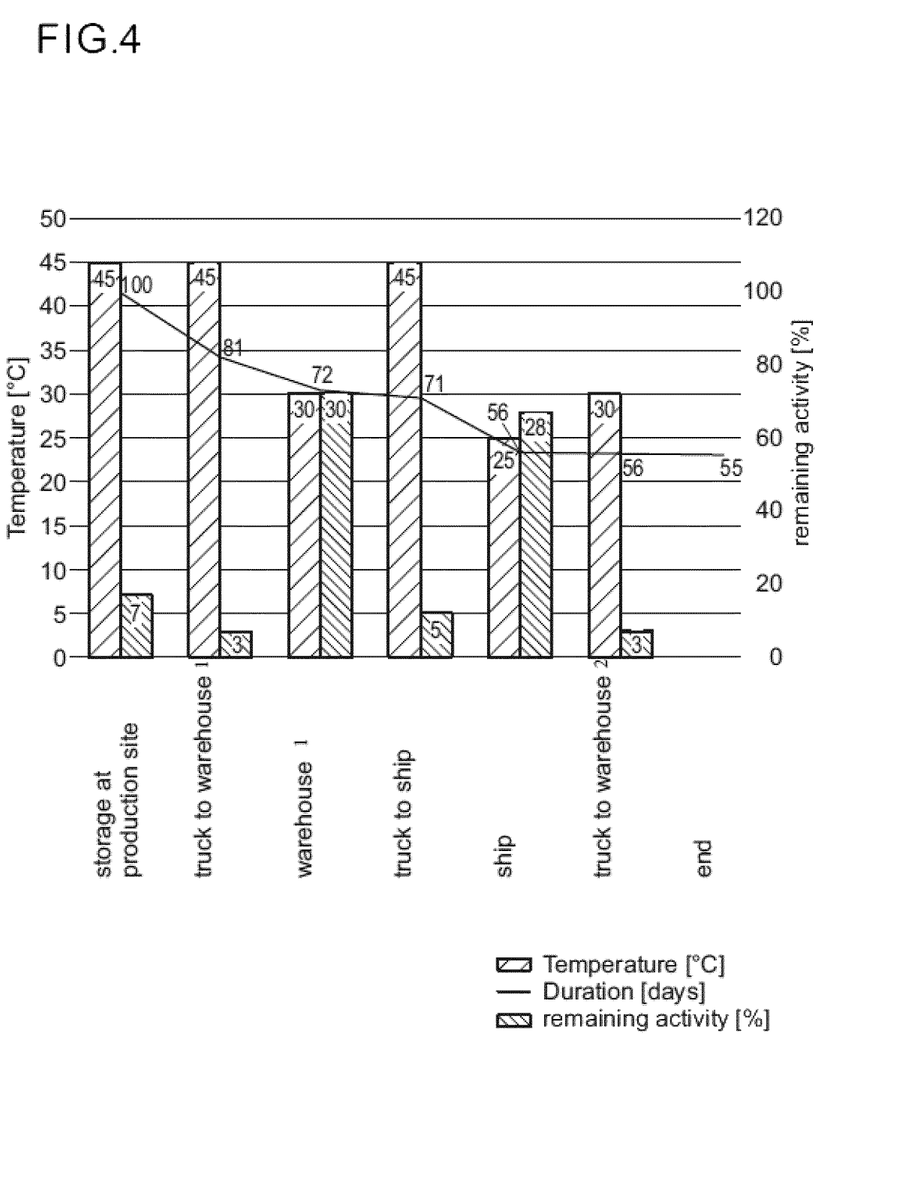
FIG. 4: Exemplary storage/transport process with remaining chemical substance activity values assigned.

FIG. 4 shows an exemplary storage profile of the chemical substance formulation of example 1 together with remaining chemical substance activity values calculated with a Weibul model, based on the data of Example 2. High-temperature segments or segments with long duration case a stronger decrease than short and/or cool storage segments. Reference signs:

10 input unit
20 processing unit
30 output unit
100 system
110 apparatus
140 web server

The invention claimed is:

1. A computer-implemented method for activity based chemical substance formulation management of a chemical substance formulation comprising
   (i) receiving input data of at least one storage segment data defined by at least temperature and storage duration and an initial chemical substance activity value of the chemical substance formulation;
   (ii) determining a remaining activity value of the chemical substance formulation based on the storage segment data and the initial chemical substance activity value via a processing unit;
   (iii) providing the remaining activity value of the chemical substance formulation; and
   (iv) managing the chemical substance formulation based on the remaining activity value of step (iii), the managing comprising at least one of
      dosing a recommended dosage based on the remaining activity value of the chemical substance formulation by controlling of a dosing equipment; and/or
      automated adjustment of a dosage of the chemical substance formulation by controlling of a dosing equipment.

2. The computer-implemented method of claim 1, wherein the at least one storage segment data is determined based on sensor data.

3. The computer-implemented method of claim 2, wherein the sensor data is received from a sensor in close proximity or within the chemical substance formulation during at least one storage segment.

4. The computer-implemented method of claim 3, wherein the sensor is located within a same storage space as the chemical substance formulation and/or is attached to a packaging, a pallet, or an outer shell of a container of the chemical substance formulation.

5. The computer-implemented method of claim 2, wherein the sensor data is corrected by calculating a temperature within the chemical substance formulation; or wherein the sensor data is received from at least one sensor located within the chemical substance formulation.

6. The computer-implemented method of claim 1, wherein an enzyme formulation is exposed to a multitude of non-identical storage segments differing at least in temperature.

7. The computer-implemented method of claim 1, wherein at the temperature of at least one storage segment is not controlled.

8. The computer-implemented method of claim 1, wherein in step (ii) the remaining activity value of the chemical substance formulation is calculated based on a model comprising a time-varying temperature parameter.

9. The computer-implemented method of claim 8, wherein the model comprises at least one temperature-dependent Weibull type equation.

10. An apparatus for activity based chemical substance formulation management of a chemical substance formulation, comprising:
    an input unit configured to receive a data input, wherein the data input comprises storage segment data defined by at least temperature and duration and an initial chemical substance activity value of the chemical substance formulation;
    a processing unit to determine a remaining activity value of the chemical substance formulation based on the storage segment data and the initial chemical substance activity value; and
    an output unit configured to output the remaining activity value of the chemical substance formulation to a user and/or to a data interface; and
    wherein the apparatus is further configured to perform at least one of the following:
    dose a recommended dosage based on the remaining activity value of the chemical substance formulation by controlling of a dosing equipment; and/or
    determine, by the processing unit, and output via the output unit, a dosage instruction for the chemical substance formulation.

11. The apparatus according to claim 10, further configured to:
    download relevant information including quality information, regulatory information, safety data, and/or technical documents;

order chemical substance formulations; and/or provide a user-feedback including usability, information content and/or chemical substance formulation outcome.

12. The apparatus according to claim 10, wherein the apparatus is a processing or production machine and further comprises a container unit configured to store a chemical substance formulation; and a dosage unit configured to dose an amount of the chemical substance formulation comprised in the container unit during a processing or production cycle based on the remaining activity value determined by the processing unit.

13. A system for providing activity based chemical substance inventory management of a chemical substance formulation, comprising:

an apparatus according to claim 10; and a web server configured to interface with the user via a webpage served by the web server and/or via an application program;

wherein the system is configured to provide a graphical user interface (GUI) to the user by the webpage and/or the application program.

14. The system of claim 13, wherein the web server serves to the user at least one of a storage segment data, defined by at least temperature and duration, and an initial chemical substance activity value of the chemical substance formulation;

parameters required for determining a remaining activity value of a chemical substance formulation and an initial chemical substance activity value of the chemical substance formulation; and the remaining activity value of the chemical substance formulation.

15. A non-transitory computer-readable storage medium comprising instructions which cause an apparatus to perform the method of claim 1.

16. A computer-implemented method according to claim 1 for determining dosing of the chemical substance formulation.

17. A computer-implemented method according to claim 1 for use in an industrial application in a field of crop protection and fertilization, in seed treatment, in laundry processes, in food processing, in animal feed processing, in biofuel production, in leather production, in textile production, in pulp and paper industry, in beverage production, in water treatment, and/or in human and veterinary medicine.

18. The method of claim 1, wherein the managing comprises automatic adjustment of a dosage of the chemical substance formulation by controlling of a dosing equipment.

* * * * *